United States Patent
Calo et al.

(10) Patent No.: US 10,361,915 B2
(45) Date of Patent: Jul. 23, 2019

(54) SYSTEM, METHOD AND COMPUTER PROGRAM PRODUCT FOR NETWORK FUNCTION OPTIMIZATION BASED ON LOCALITY AND FUNCTION TYPE

(71) Applicant: International Business Machines Corporation, Armonk, NY (US)

(72) Inventors: Seraphin Calo, Yorktown Heights, NY (US); Douglas Freimuth, Yorktown Heights, NY (US); Thai V. Le, Yorktown Heights, NY (US); Christian Makaya, Yorktown Heights, NY (US); Eric Nahum, Yorktown Heights, NY (US); Dinesh Verma, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/282,555

(22) Filed: Sep. 30, 2016

(65) Prior Publication Data
US 2018/0097696 A1  Apr. 5, 2018

(51) Int. Cl.
*G06F 9/50* (2006.01)
*H04L 12/24* (2006.01)
*H04L 29/08* (2006.01)

(52) U.S. Cl.
CPC ...... *H04L 41/0823* (2013.01); *H04L 41/5009* (2013.01); *H04L 41/5019* (2013.01); *G06F 9/5077* (2013.01); *H04L 41/0893* (2013.01); *H04L 41/5096* (2013.01); *H04L 67/10* (2013.01); *H04L 67/16* (2013.01)

(58) Field of Classification Search
CPC ..... H04L 67/10; H04L 67/16; H04L 12/4641; H04L 41/12; H04L 41/145; H04L 45/02; H04L 45/64; H04L 41/0803; H04L 41/0806; H04L 41/0813; H04L 41/0823; G06F 2009/4557; G06F 9/5077
See application file for complete search history.

(56) References Cited

U.S. PATENT DOCUMENTS

| | | | | |
|---|---|---|---|---|
| 9,699,116 | B2 * | 7/2017 | Zhang | H04L 49/35 |
| 9,733,987 | B2 * | 8/2017 | Herdrich | G06F 9/5077 |
| 9,806,979 | B1 * | 10/2017 | Felstaine | G06F 11/2002 |
| 9,853,869 | B1 * | 12/2017 | Shaham | H04L 67/10 |
| 9,860,790 | B2 * | 1/2018 | Khan | H04L 45/308 |
| 9,967,136 | B2 * | 5/2018 | Krishnan | H04L 41/0803 |
| 10,057,112 | B2 * | 8/2018 | Shevenell | H04L 67/10 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — David R Lazaro
(74) *Attorney, Agent, or Firm* — Jennifer R. Davis, Esq.; McGinn IP Law Group, PLLC (57) ABSTRACT

A network function optimization method, system, and computer program product, include annotating network functions by providing constraints on a placement of different virtual network function chain components and optimizing the network function chain by modifying a structure of the network function chain based on the constraints in the annotating.

16 Claims, 7 Drawing Sheets

(56) References Cited

U.S. PATENT DOCUMENTS

| | | | | |
|---|---|---|---|---|
| 2016/0149811 A1* | 5/2016 | Roch | .................. | H04L 45/745 |
| | | | | 370/392 |
| 2016/0179582 A1* | 6/2016 | Skerry | ................ | G06F 9/5077 |
| | | | | 718/1 |
| 2016/0218917 A1* | 7/2016 | Zhang | .................. | H04L 49/35 |
| 2017/0019302 A1* | 1/2017 | Lapiotis | .............. | H04L 41/145 |
| 2017/0090987 A1* | 3/2017 | Hearn | ................ | G06F 9/4881 |
| 2017/0126792 A1* | 5/2017 | Halpern | ............ | H04L 41/0896 |
| 2017/0279672 A1* | 9/2017 | Krishnan | ........... | H04L 41/0803 |
| 2017/0288971 A1* | 10/2017 | Jayaraman | ............. | H04L 41/12 |
| 2017/0318097 A1* | 11/2017 | Drew | .................. | H04L 67/16 |
| 2017/0324612 A1* | 11/2017 | Perez | ................ | H04L 41/0806 |
| 2017/0366623 A1* | 12/2017 | Shi | ........................ | H04L 67/32 |
| 2017/0371692 A1* | 12/2017 | Connolly | ........... | G06F 9/45558 |
| 2018/0034703 A1* | 2/2018 | Anholt | ............... | H04L 12/4641 |
| 2018/0041388 A1* | 2/2018 | Moens | .................. | H04L 67/10 |
| 2018/0060136 A1* | 3/2018 | Herdrich | .............. | G06F 9/5077 |
| 2018/0063018 A1* | 3/2018 | Bosch | ................. | H04L 47/822 |
| 2018/0077080 A1* | 3/2018 | Gazier | ................. | H04L 47/803 |
| 2018/0091420 A1* | 3/2018 | Drake | ................... | H04L 45/38 |
| 2018/0097696 A1* | 4/2018 | Calo | ................. | H04L 41/0823 |

OTHER PUBLICATIONS

Riggio, Roberto, et al. "Virtual Network Functions Orchestration in Enterprise WLANs". CREATE-NET, Itlay.

Luizelli, Marcelo Caggiani, et al. "Piecing Together the NFV Provisioning Puzzle: Efficient Placement and Chaining of Virtual Network Functions". Institute of Informatics—Federal University of Rio Grande do Sul (UFRGS).

\* cited by examiner

FIG. 1

NETWORK CONNECTION OPTIMIZATION METHOD 100

SYSTEM, METHOD AND COMPUTER PROGRAM PRODUCT FOR NETWORK FUNCTION OPTIMIZATION BASED ON LOCALITY AND FUNCTION TYPE

BACKGROUND

The present invention relates generally to a network function optimization method, and more particularly, but not by way of limitation, to a system, method, and computer program product to optimize the deployment of cloud services which are composed of virtualized software network functions by exploiting locality of functions.

Conventionally, various network functions (e.g., firewalls, intrusion detections systems, proxy caches, tunnels, etc.) have been implemented in custom hardware. Their placement has typically been determined by functional requirements (e.g., an encrypting tunnel placed before packets traverse the public Internet, etc.), which include physical restrictions. As such, these devices have had little, if any, flexibility in where they are placed (e.g., positioned).

Recently, a move has occurred where these functions are implemented in software. This allows much greater flexibility in their placement. In particular, they can be deployed in virtual machines and containers, allowing much more dynamic behavior, such as more rapid deployment, performance scaling up/down and out/in with load, and live migration from one physical machine to another. This transformation creates the potential to innovate around optimizing the deployment of the software-based appliances that are used to create a service. Optimizing the performance of these software appliances allows achieving the same functionality, but with using fewer physical resources (e.g., CPU, network bandwidth, etc.) and reduced energy consumption.

Service placement in clouds has recently been considered, attempting to provision/orchestrate services in such a way as to minimize cross-interference, match commentary services (e.g., locate a CPU-bound service with an I/O bound service).

However, the recent techniques have not considered characteristics of the wide-area network (e.g., bandwidth, round trip time (RTT), packet loss rate, jitter, etc.), characteristics of the network function that are specific to networking (e.g., Quality of Service (QoS) requirements, RTT, bandwidth, loss rate), and network services (NS) policy versus global data center policy (i.e., DC policy).

There is a need in the art to optimize the deployment of cloud services which are composed of virtualized software network functions by exploiting locality of functions.

SUMMARY

In an exemplary embodiment, the present invention can provide a computer-implemented network function optimization method, the method including annotating network functions by providing constraints on a placement of different virtual network function chain components and optimizing the network function chain by modifying a structure of the network function chain based on the constraints in the annotating.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIG. 1-6, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
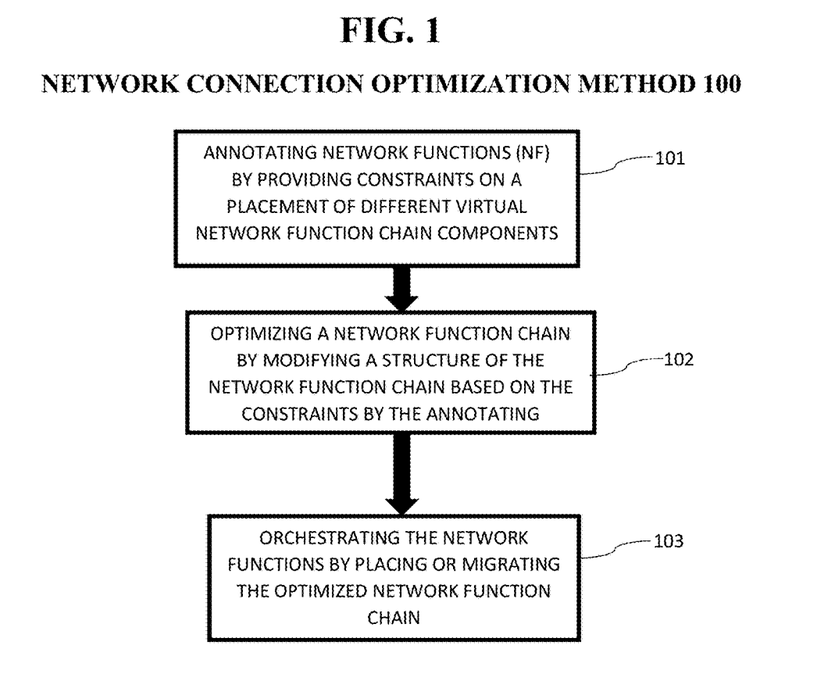
FIG. 1 exemplarily shows a high-level flow chart for a network function optimization method 100.

With reference now to the example depicted in FIG. 1, the network function optimization method 100 includes various steps to consider key performance indicators (KPIs) of both the virtual network function and the hardware that it is placed on so as to determine deploying VNFs on a set of hardware, so as to minimize cost or maximize utility. As shown in at least FIG. 4, one or more computers of a computer system 12 according to an embodiment of the present invention can include a memory 28 having instructions stored in a storage system to perform the steps of FIG. 1.

Thus, the network function optimization method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 4-6) may be implemented in a cloud environment 50 (see e.g., FIG. 5), it is nonetheless understood that the present invention can be implemented outside of the cloud environment.

In step 101, network function(s) (NF) are annotated by providing constraints on a placement of different virtual network function (VNF) chain components. The annotation associates metadata with a particular network function. This metadata includes, for example, types of information such as whether the service requires topological placement in order to fulfill its goals (e.g., a transparent proxy needs to be close to its clients), what the primary resources are that are consumed by the function (e.g., network bandwidth, memory bandwidth, CPU cycles, disk bandwidth, etc.), what kind of data transformation happens (e.g., compressed, encrypted, decrypted, transcoded, authenticated, read, written, de-duplicated, etc.), etc. The metadata could be input by a network/system administrator, or derived historically from function operation.

In step 102, the network function chain is optimized by modifying a structure of the network function chain based on the constraints by the annotating. That is, the annotations in step 101 are considered when placing or migrating a network function to optimize the network function chain. For example, when two functions (e.g., data-intensive, such as compression and encryption) are placed together, they utilize the same resource and thus optimize performance (e.g., reducing cache misses). Also, the network function chain can be optimized when two functions perform complementary operations (encryption and decryption, compression and decompression, etc.) and are located on the same host (e.g., containers) or hypervisor (e.g., VMs), the network functions are annotated when it is recognized that the combination is unnecessary and thus can be removed in step 102 or that flows can be routed around the combination.

In some embodiments, in step 102, the network function chain can be optimized when a function's performance is dependent on the network characteristics to another system (e.g., client, server, or network function), and the function is placed accordingly in step 102 (e.g., when a CDN node or Web cache needs to be instantiated on one of several nodes, the node is chosen that has the lowest RTT/highest bandwidth to the client).

In step 103, the network functions are orchestrated by placing or migrating the optimized network function chain.

Figure 2A:
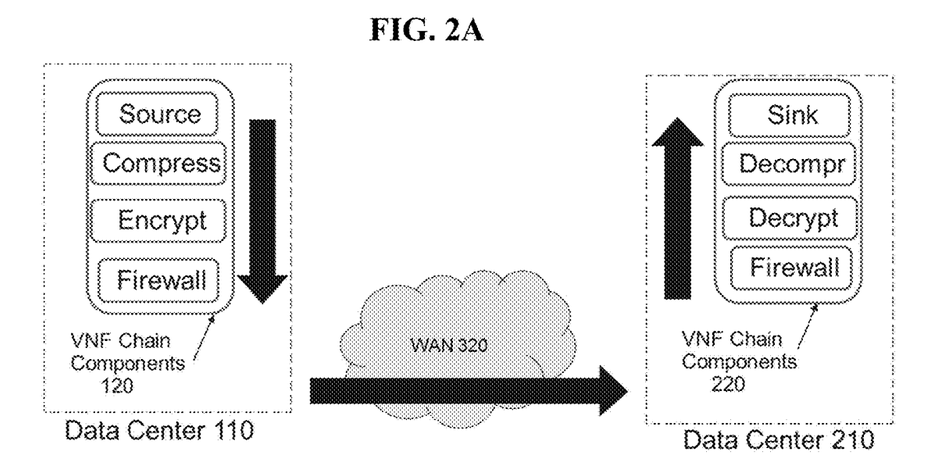
FIGS. 2A-2B exemplarily depicts an exchange between a first data center 110 and a second data center 210 over a wide-area-network (WAN) 320 including virtual network function chain components.

Now referring to FIGS. 2A-2B, FIG. 2A exemplarily depicts an exchange between a first data center 110 and a second data center 210 over a wide-area-network (WAN) 320 before migration of the network functions. As shown, the sender (e.g., the data center 110) includes virtual network function chain components 120 of "SOURCE", "COMPRESS", "ENCRYPT", and "FIREWALL" in which each are performed and the receiver (e.g., the data center 210) receives the data and performs each of the corresponding network functions in the virtual network function chain components 220 of "SINK", "DECOMPR", "DECRYPT", "FIREWALL".

Figure 2B:
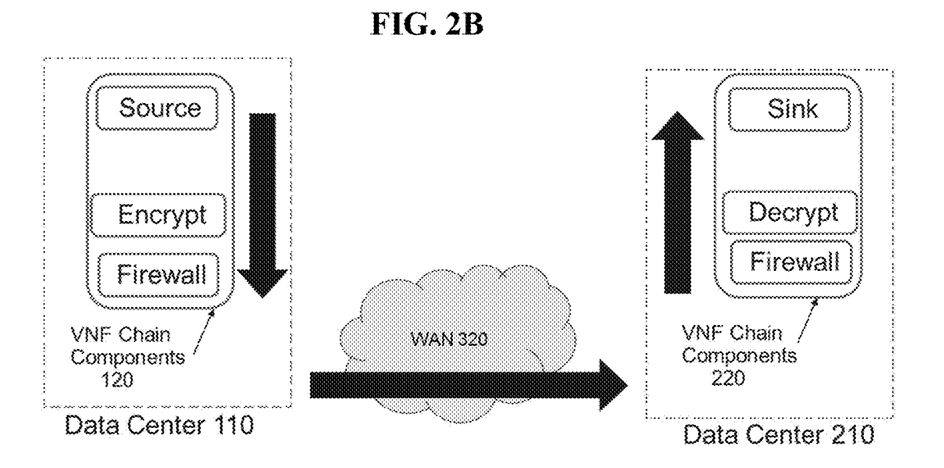

However, in step 101, the network functions are annotated by providing constraints on a placement of different virtual network function chain components. As shown in FIG. 2B, the VNF chain components 120 are annotated with the constraint that "the bandwidth of the WAN 320 is inexpensive between the data center 110 and the data center 210" and in step 102, the network function chain is optimized by modifying the structure of the virtual network function chain components based on the constraints in step 101. That is, in step 102, the network function chain is optimized by removing the network function of "COMPRESS" and "DECOMPR" in each of the respective data centers. Thus, resources can be saved by optimizing the virtual network function chain components.

It is noted that in FIGS. 2A-2B, data center 110 and data center 210 can include an exchange between two clients, between a client to a data center, between two data centers, etc. That is, the data center 110 and data center 210 merely depict a server in which virtual network function chain components interact.

Figure 3A:
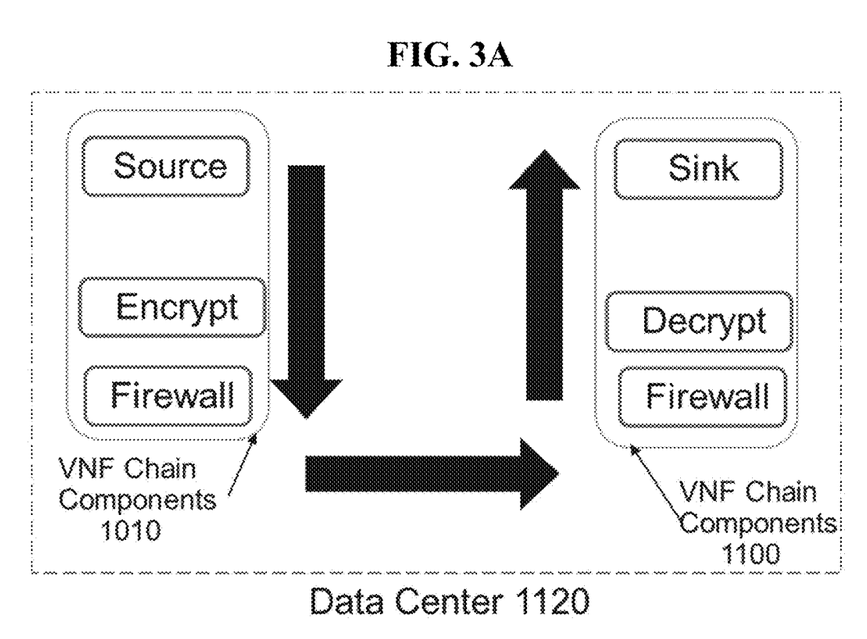
FIGS. 3A-3C exemplarily depicts an exchange between virtual machines in a data center 1120 including virtual network function chain components.
Figure 3B:
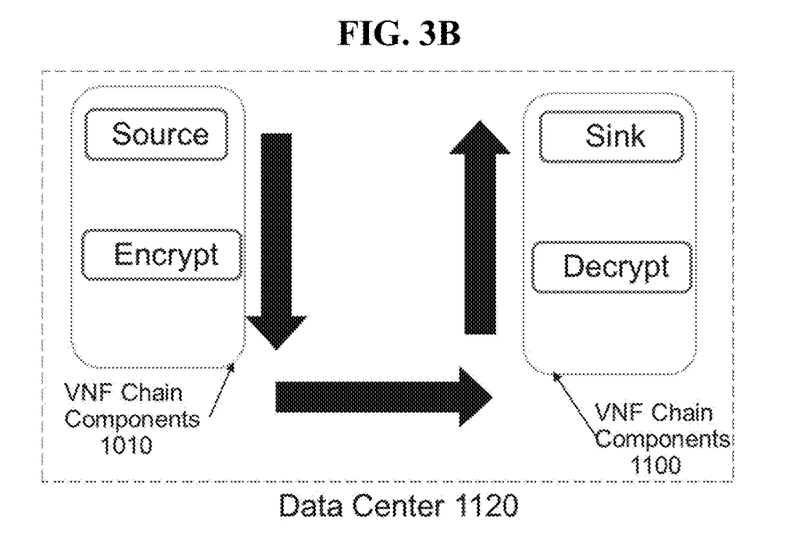
Figure 3C:
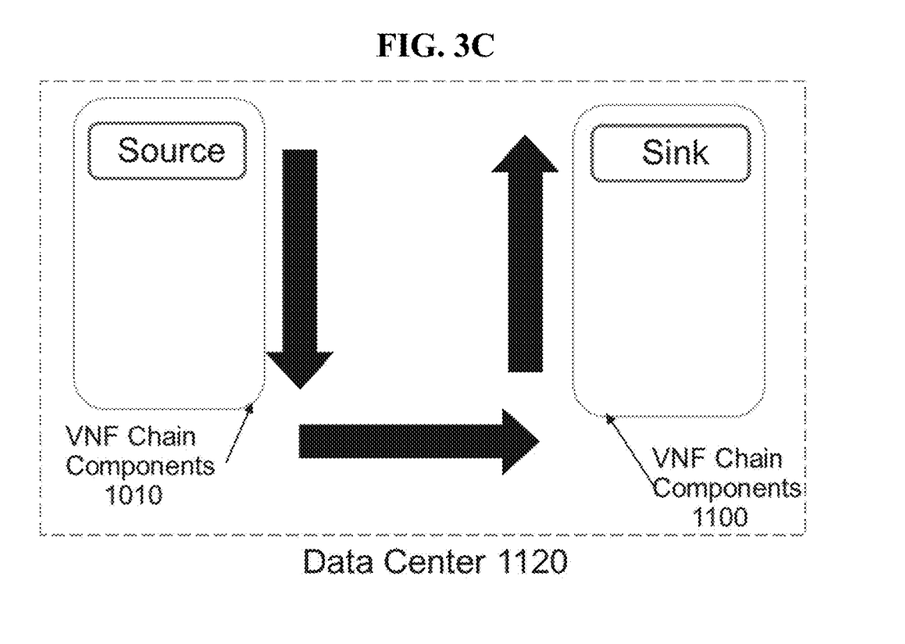

With reference now to FIGS. 3A-3C, FIGS. 3A-3C exemplarily depict an exchange between a single data center such as a client server to an on-site data center hosted by a company.

As shown in FIG. 3A, because bandwidth is an abundant resource as annotated in step 101 while sending data between an on-site data center and a server, in step 102, the "COMPRESS" and "DECOMPR" are removed (e.g., the VNF chain components 1010 and 1100) are optimized.

Further, as shown in FIG. 3B, in step 101, n additional constraint to the constraint of FIG. 3A that traffic within a single data center 1120 is allowed such that no "FIREWALL" is needed, the "FIREWALL" of the VNF chain components 1010 and 1100 is removed in step 102 by optimizing the network function chain by modifying the structure based on the annotated constraints (e.g., no firewall required).

As shown in FIG. 3C, in step 101, an additional constraint to the constraints of FIGS. 3A and 3B that network functions exchanging data on a same datacenter do not require encryption and decryption network functions, the "ENCRYPT" and "DECRYPT" of the VNF chain components 1010 and 1100 are removed in step 102 by optimizing the network function chain by modifying the structure based on the annotated constraints (e.g., encryption/decryption required).

In some embodiments, the network topology that describes network topology and performance is annotated (e.g., BW, loss rate, RTT, jitter, etc.) while constraints are added based on cluster/datacenter state and performance (e.g., CPU utilization, memory utilization, I/O utilization, etc.). Further, the constraints in step 101 can be based on a policy engine that describes policy relationships (e.g., firewall must precede Web cache, no User Datagram Protocol (UDP) traffic, etc.). The virtual network function chain components are subsequently optimized by modifying the structure of the network function chain components based on the constraints according to the policy engine. Subsequently, the network functions are orchestrated by placing or migrating the optimized network function chain.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
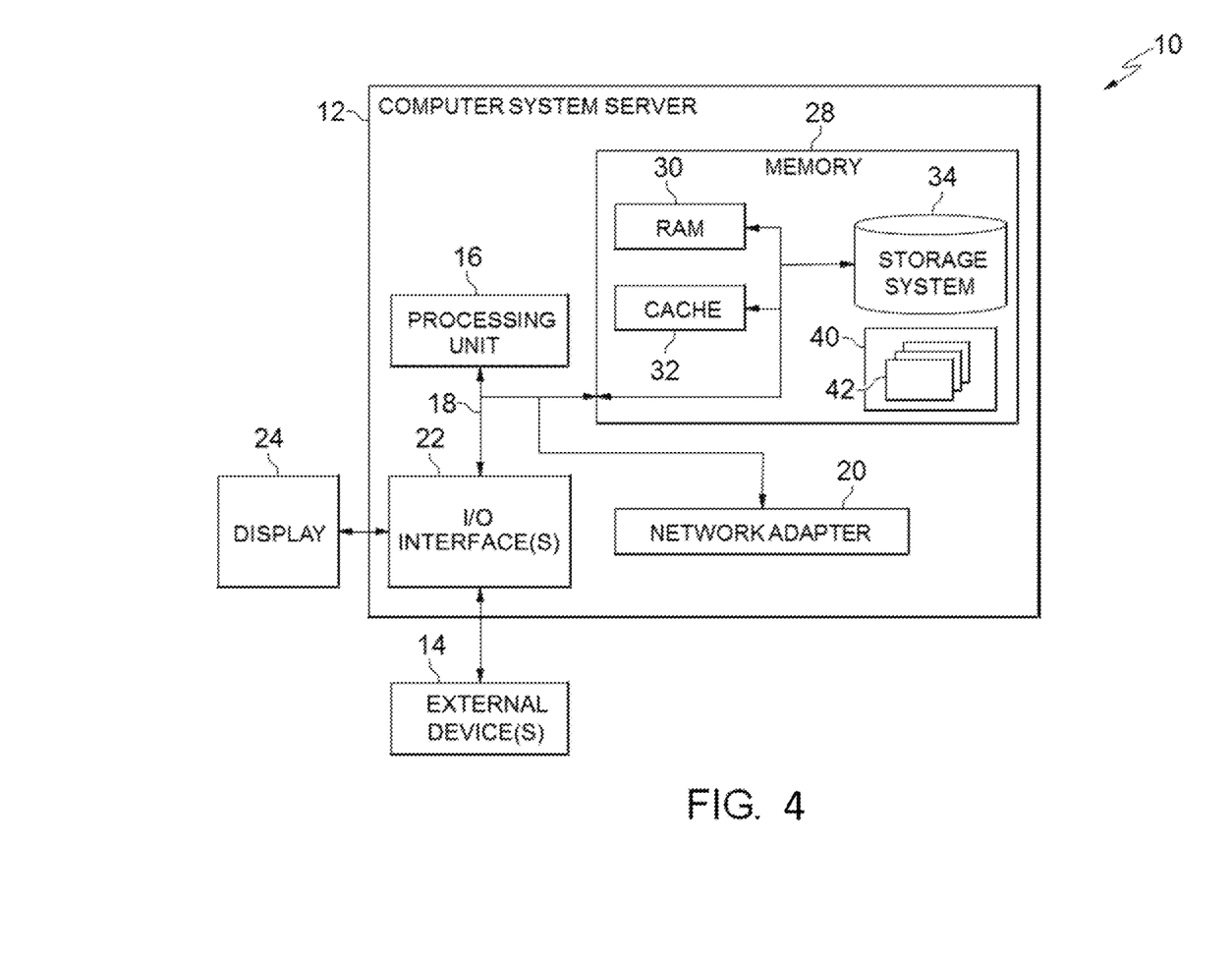
FIG. 4 depicts a cloud computing node 10 according to an embodiment of the present invention.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 4, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
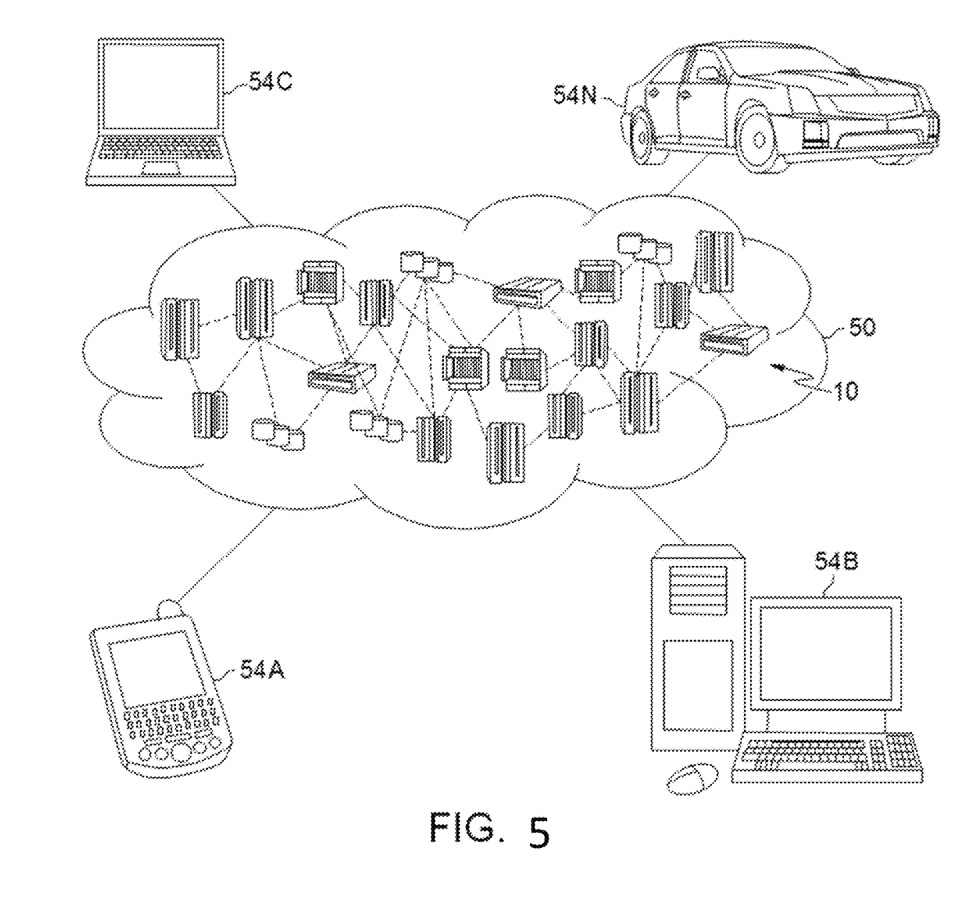
FIG. 5 depicts a cloud computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
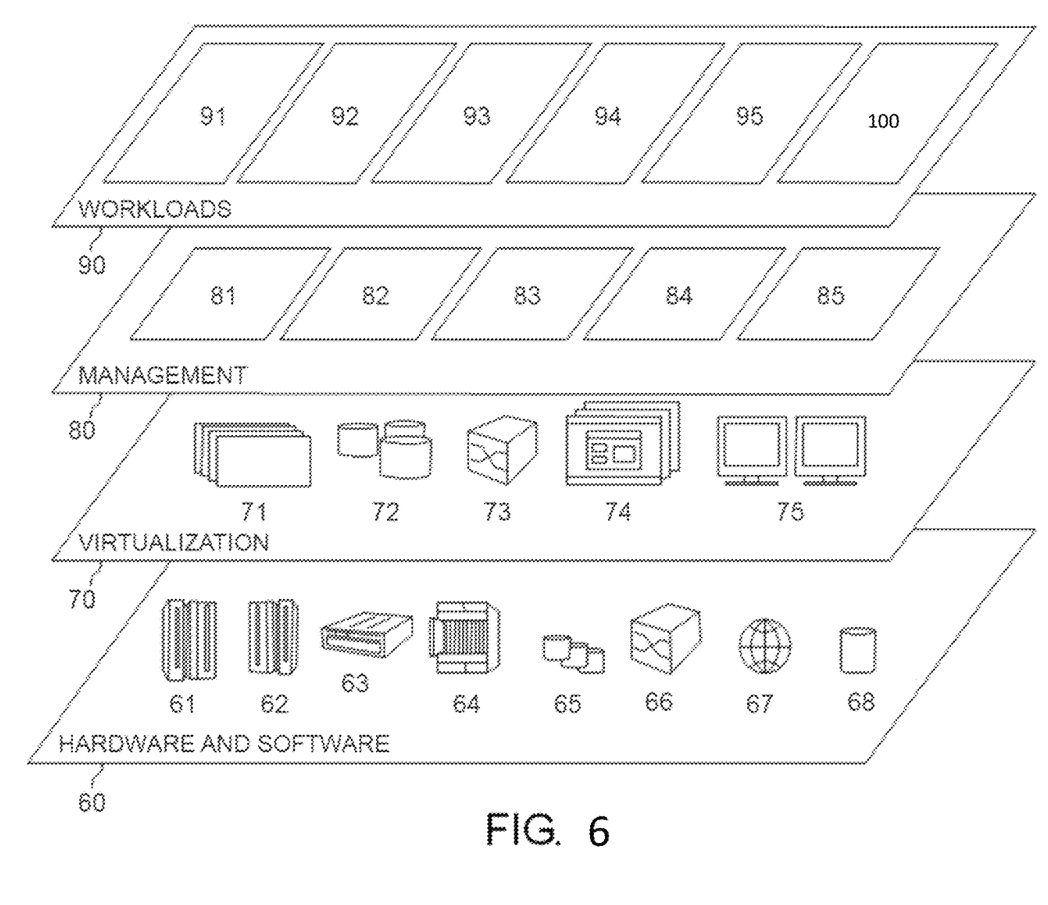
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the network function optimization method 100.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented network function optimization method, the method comprising:
    annotating software-implemented virtual network functions by providing a constraint according to a policy requirement on a placement of different virtual network function chain components of the network functions; and
    optimizing the network function chain components by modifying a structure of the network function chain components based on the constraint in the annotating to combine complementary virtual network function chain components together in the placement and by removing one of the functions of the network function chain components in response to the constraint according to the policy requirement.

2. The computer-implemented method of claim 1, further comprising orchestrating the optimized network function chain components by placing or migrating the optimized network function chain.

3. The computer-implemented method of claim 1, wherein the constraint is based on a policy engine that describes policy relationships for exchange via the network functions chain components.

4. The computer-implemented method of claim 1, wherein the annotating associates metadata with each network function to provide the constraint, the metadata comprises:
    types of information including at least one of:
        whether a service requires a topological placement in order to fulfill a goal;
        a primary resource consumed by the structure of the network function chain components; and
        a type of data transformation that is required.

5. The computer-implemented method of claim 1, wherein the optimizing removes complementary network functions in the network function chain components.

6. The computer-implemented method of claim 1, embodied in a cloud-computing environment.

7. A computer program product for network function optimization, the computer program product comprising a computer-readable storage medium having program instructions embodied therewith, the program instructions executable by a computer to cause the computer to perform:
    annotating software-implemented virtual network functions by providing a constraint according to a policy requirement on a placement of different virtual network function chain components of the network functions; and
    optimizing the network function chain components by modifying a structure of the network function chain components based on the constraint in the annotating to combine complementary virtual network function chain components together in the placement and by removing one of the functions of the network function chain components in response to the constraint according to the policy requirement.

8. The computer program product of claim 7, further comprising orchestrating the optimized network function chain components by placing or migrating the optimized network function chain components.

9. The computer program product of claim 7, wherein the constraint is based on a policy engine that describes policy relationships for exchange via the network function chain components.

10. The computer program product of claim 7, wherein the annotating associates metadata with each network function to provide the constraint, the metadata comprises:
    types of information including at least one of:
        whether a service requires a topological placement in order to fulfill a goal;
        a primary resource consumed by the structure of the network function chain components; and
        a type of data transformation that is required.

11. The computer program product of claim 7, wherein the optimizing removes complementary network functions in the network function chain components.

12. A network function optimization system, said system comprising:
    a processor; and
    a memory, the memory storing instructions to cause the processor to perform:
        annotating software-implemented virtual network functions by providing a constraint according to a policy requirement on a placement of different virtual network function chain components of the network functions; and
        optimizing the network function chain components by modifying a structure of the network function chain components based on the constraint in the annotating to combine complementary virtual network function chain components together in the placement and by removing one of the functions of the network function chain components in response to the constraint according to the policy requirement.

13. The system of claim 12, wherein the memory further stores instructions to cause the processor to perform:
    orchestrating the optimized network function chain by placing or migrating the optimized network function chain components.

14. The system of claim 12, wherein the constraint is based on a policy engine that describes policy relationships for exchange via the network function chain components.

15. The system of claim 12, wherein the annotating associates metadata with each network function to provide the constraint, the metadata comprises:
    types of information including at least one of:
        whether a service requires a topological placement in order to fulfill a goal;
        a primary resource consumed by the structure of the network function chain components; and
        a type of data transformation that is required.

16. The system of claim 12, embodied in a cloud-computing environment.

* * * * *